US012377566B2

(12) United States Patent
Barbe et al.

(10) Patent No.: US 12,377,566 B2
(45) Date of Patent: Aug. 5, 2025

(54) METHOD FOR LAYING OUT PIECES TO BE CUT AUTOMATICALLY INTO A PATTERNED FABRIC

(71) Applicant: LECTRA, Paris (FR)

(72) Inventors: Stéphane Barbe, Pessac (FR); Patrick Moreau, La Brede (FR); Sébastien Fernandes, Pessac (FR)

(73) Assignee: LECTRA, Paris (FR)

( * ) Notice: Subject to any disclaimer, the term of this patent is extended or adjusted under 35 U.S.C. 154(b) by 720 days.

(21) Appl. No.: 17/617,489

(22) PCT Filed: May 28, 2020

(86) PCT No.: PCT/FR2020/050899
§ 371 (c)(1),
(2) Date: Dec. 8, 2021

(87) PCT Pub. No.: WO2020/254739
PCT Pub. Date: Dec. 24, 2020

(65) Prior Publication Data
US 2022/0234233 A1      Jul. 28, 2022

(30) Foreign Application Priority Data
Jun. 21, 2019   (FR) ...................... 1906727

(51) Int. Cl.
*B26D 5/00*        (2006.01)
*B26D 7/01*        (2006.01)
*B26F 1/38*        (2006.01)

(52) U.S. Cl.
CPC .............. *B26D 5/005* (2013.01); *B26D 7/018* (2013.01); *B26D 2005/002* (2013.01); *B26F 1/38* (2013.01)

(58) Field of Classification Search
CPC ..... B26D 5/00; B26D 5/005; B26D 2005/002
(Continued)

(56) References Cited

U.S. PATENT DOCUMENTS 5,333,111 A * 7/1994 Chaiken .................. B26D 5/00
                                                                83/76.8
5,975,743 A * 11/1999 Bercaits ................ B26D 5/007
                                                                700/134

FOREIGN PATENT DOCUMENTS

EP        0518473 A2    12/1992
EP        0759708 A1     3/1997
(Continued)

OTHER PUBLICATIONS

Search Report and Written Opinion from corresponding French Application No. FR1906727, Mar. 12, 2020.
(Continued)

*Primary Examiner* — Nathan E Durham
(74) *Attorney, Agent, or Firm* — Workman Nydegger (57) ABSTRACT

A method for placing pieces intended to be cut automatically from a fabric having a pattern that repeats at a predetermined pitch, called pattern pitch, involves the steps of determining a list of pieces to be placed on the fabric, for at least one piece of the placement, calculating a contour to be placed around the piece, the contour having a variable margin in order to avoid an overlap between adjacent pieces, the margin being a function of a predefined rate of variation of the fabric and of at least one predetermined constraint of placement of the piece on the fabric, and developing a theoretical placement of the pieces on the fabric taking into account the contour to be placed of each piece.

11 Claims, 7 Drawing Sheets

(58) Field of Classification Search
USPC .......................................... 700/132, 134, 135
See application file for complete search history.

(56) References Cited

FOREIGN PATENT DOCUMENTS

| | | |
|---|---|---|
| EP | 2328729 A1 | 6/2011 |
| JP | H10500461 A | 1/1998 |
| JP | 2012144827 A | 8/2012 |
| JP | 2014111848 A | 6/2014 |

OTHER PUBLICATIONS

International Search Report and Written Opinion from PCT Application No. PCT/FR2020/050899, Oct. 6, 2020.

* cited by examiner

METHOD FOR LAYING OUT PIECES TO BE CUT AUTOMATICALLY INTO A PATTERNED FABRIC

TECHNICAL FIELD

The present invention relates to the general field of the automatic cutting of pieces from a fabric having a pattern that repeats at a predetermined pitch.

Fields of application of the invention are in particular the clothing and furniture industries.

PRIOR ART

When the production of clothing articles or furnishing elements involves an assembly of pieces cut from a fabric, there are particular constraints if the fabric is patterned, the expression "patterned fabric" here designating any flexible textile material made of sheet printed with a pattern that repeats at regular and predetermined pitches.

In this case, it is then desirable, or even necessary, to respect the continuity of the pattern between two assembled pieces, for example two garment parts sewn together, or two pieces intended to be adjacent, for example two garment parts located side by side when the garment is worn, or two sofa cushions laid side by side.

In order to comply with these constraints, it is known to associate the pieces with absolute or relative position marks and to establish a hierarchy between main pieces and secondary pieces.

An absolute position mark is normally associated with a main piece. It characterizes the absolute positioning of the main piece relative to the pattern of the fabric. The position of a piece relative to the pattern is characterized by the fact that a given point on the surface of the piece occupies a determined relative position relative to the patterns that surround it. Thus, pieces whose locations on the surface of the fabric are deduced from each other by translations of pattern pitch integer number occupy the same position relative to the pattern.

Relative position marks are associated with two pieces to be assembled taking into account imperatives related to the existence of the pattern. They identify the locations of two link points to be matched when assembling the pieces.

For example, in the case of a jacket, a front piece can constitute a main piece. An absolute position mark is possibly associated with the front piece, for example when it is desired that a complete pattern is visible in a particular location of this piece. A sleeve, the neckline, a pocket flap ... then constitute secondary pieces. For each of them, the location of a connection point is determined to match with the location of the associated connection point on the main piece.

Furthermore, it is known to cut fabric automatically. Automatic cutting installations are marketed by the applicant for many years.

Typically, an automatic cutting method comprises a placement operation which consists in optimally determining the positions of the pieces to be cut in a fabric web. The placement is chosen so as to minimize the losses of fabric while complying with some constraints: respect of the straight grain, sufficient minimum margin between pieces, etc. . . . . In the case of a patterned fabric, the constraints related to the respect of the locations of the absolute position and relative position marks are added. Systems allowing an operator to define placements using computer workstations and specialized software are known, including in the case of patterned fabrics.

In order to perform the cutting, the fabric is spread on a cutting table in one or several superimposed layers which can be held by suction through the table. The cutting is performed by means of a tool carried by a head whose displacements, relative to the cutting table, are controlled according to the predetermined placement. The cutting can be performed by vibrating blade, laser, water jet, etc.

Difficulties arise when the fabric used is a patterned fabric. Particularly, the problem of the non-coincidence between the fabric model used for the placement and the fabric actually spread on the cutting table arises in practice. This non-coincidence is reflected in particular as follows. If one stand on the cutting table at the coordinates of a reference point of a piece of the placement, it is observed that the corresponding point on the spread fabric does not always occupy the desired relative position relative to the pattern of the real fabric. These deviations are more or less large and in practice inevitable. They are due to printing defects and/or to deformations of the fabric which can result in irregularities in the pattern repetition pitch. As a result, the pre-established placement, or theoretical placement, must be modified to match the reality of the spread fabric.

A method for performing this placement modification automatically is described in document EP 0,759,708 filed in the name of the Applicant. After spreading the patterned fabric on the cutting table, this method provides for detecting a possible offset between the actual pitch of the pattern on the fabric and the theoretical pitch thereof thanks to an image capture of parts of the spread fabric then a checking on the captured images that locations corresponding to stored information occupy desired positions relative to the actual pattern of the spread fabric. If necessary, the theoretical placement of the pieces is modified according to the result of the monitoring in order to adapt it to the actual pitch of the pattern on the spread fabric.

This method has many advantages, in particular that of allowing gradual correction of the placement starting from a longitudinal end of the fabric. The cutting of the fabric is the performed, starting from this end, as the monitoring progresses. As a result, this invention can be implemented with an automatic cutting installation in which the cutting table has a reduced length, which allows, compared to the prior art, eliminating the need to resort to specific installations for the cutting of patterned fabrics.

In practice, the method described in document EP 0,759,708 provides for repositioning the pieces in the event of detection of a possible offset between a stored reference point of the fabric and a characteristic pattern point closest on the fabric spread on the cutting table.

However, at the end of this modification of the theoretical placement, the pieces which are repositioned are not all of the same value, so that there is a non-negligible risk that these displacements of pieces lead to overlaps between the pieces (that is to say pieces which overlap at least partially). However, the overlap between the pieces can lead to a defect in the cutting quality.

Different solutions are also known from documents EP 0,518,473 and EP 2,328,729 to solve the problem of non-coincidence between the patterned fabric model used for the placement and the fabric actually spread on the cutting table. In these documents, it is thus provided to define border regions encompassing each piece to be cut and inside which it is possible to make corrections to the placement of the piece in the event of detection of non-coincidence between the fabric model and the spread fabric. In practice, the dimensions of these border regions are directly proportional to the theoretical pitch of the fabric pattern. Thus, it is provided to increase the size dimensions by half a pitch of the pattern in document EP 0,518,473, and by a full pitch in document EP 2,328,729.

However, these solutions are not satisfactory. Indeed, when the theoretical pitch of the fabric pattern is large (for example on the order of several tens of centimeters), these solutions lead to generate the spacing between the extremely large pieces, and this is detrimental to the efficiency of the theoretical placement of the pieces and greatly increases the losses.

DISCLOSURE OF THE INVENTION

The present invention therefore aims at proposing a method for placing pieces intended to be cut automatically which does not have the aforementioned drawbacks.

In accordance with the invention, this aim is achieved by means of a method for placing pieces intended to be cut automatically from a fabric having a pattern that repeats at a predetermined pitch, called pattern pitch, the method comprising the steps of:

a—determining a list of pieces to be placed on the fabric;
b—for at least one piece of the placement, calculating a contour to be placed around the piece, the contour comprising a variable margin in order to avoid an overlap between adjacent pieces, the margin being a function of a predefined rate of variation of the fabric and of at least one predetermined constraint of placement of the piece on the fabric; and
c—developing a theoretical placement of the pieces on the fabric taking into account the contour to be placed of each piece.

The method according to the invention is remarkable in that it provides for calculating a contour to be placed encompassing each piece as a function of several parameters, namely the rate of variation of the fabric (which corresponds to a percentage of elongation of the fabric pattern) and one or several predetermined constraints for the placement of the piece on the fabric. Thus, rather than arbitrarily applying a spacing margin corresponding to a percentage of the theoretical pitch of the fabric pattern, the method according to the invention allows applying a variable margin taking into account the particularities of the placement of the pieces on the fabric, this variable margin being at any point of the piece the sum of a spacing margin and of a positioning margin. This results in a management of the risk of overlapping of the pieces, which allows greatly limiting the losses of efficiency in the theoretical placement of the pieces.

Advantageously, each piece is associated with an initial contour represented by a polygon, a reference point, and at least one constraint of placement of the piece on the fabric chosen among:

absolute constraint for which the position of the reference point of the piece relative to the fabric pattern is determined so that a fabric pattern appears at a desired location in the piece;
relative constraint for which the position of the reference point of the piece, called child piece, is determined relative to a link point of another piece, called parent piece, so that the position of the reference point of the child piece relative to the fabric pattern is the same as the position of the link point of the parent piece; and
free constraint for which the position of the reference point of the piece relative to the fabric pattern is free.

According to one embodiment, the calculation of the contour to be placed comprises, for each piece, a step of calculating a spacing margin to be applied to the initial contour of the piece in order to obtain a spacing contour of the piece, followed by a step of calculating a positioning margin to be applied to the spacing contour of the piece in order to obtain the contour to be placed of the piece.

In this embodiment, the spacing margin of a piece can be advantageously calculated according to a weft direction and a warp direction of the fabric and for each edge of the polygon representing the initial contour of the piece, the spacing margin of an edge being equal, for each direction of the fabric, to the product between the rate of variation of the fabric and a vector between points of the edge and the reference point of the piece.

In addition, the positioning margin of a piece with which an absolute constraint or a free constraint is associated is preferably zero.

Likewise, the positioning margin of a child piece with which a relative constraint is associated is advantageously calculated according to a weft direction and a warp direction of the fabric and is equal, for each direction of the fabric, to the product between the rate of variation of the fabric and a link vector of the piece, the link vector being the sum of the piece vectors of all the parent pieces of a link warp associated with the child piece, the piece vector of a parent piece being defined between its reference point and its link point.

According to another embodiment, the calculation of the contour to be placed comprises, for each piece, a step of calculating a positioning margin to be applied to the initial contour of the piece in order to obtain a positioning contour of the piece, followed by a step of calculating a spacing margin to be applied to the positioning contour of the piece in order to obtain the contour to be placed of the piece.

In this other embodiment, the spacing and positioning margins are advantageously calculated in the same way as for the other embodiment.

DESCRIPTION OF THE EMBODIMENTS

The invention relates to the creation of a placement of a group of pieces intended to be cut from a repeating pattern fabric, for example by means of an automatic cutting installation such as the one described in the publication EP 0,759,708.

Before creating the placement of the pieces, it is necessary to characterize the fabric from which the pieces will be cut. This step can be carried out by taking manual measurements on the fabric, based on the information provided by the manufacturer or by scanning a web of material to automatically recognize the pattern and characterize it; number of grids, warp pitches, weft pitches, offsets, etc.

Figure 1:
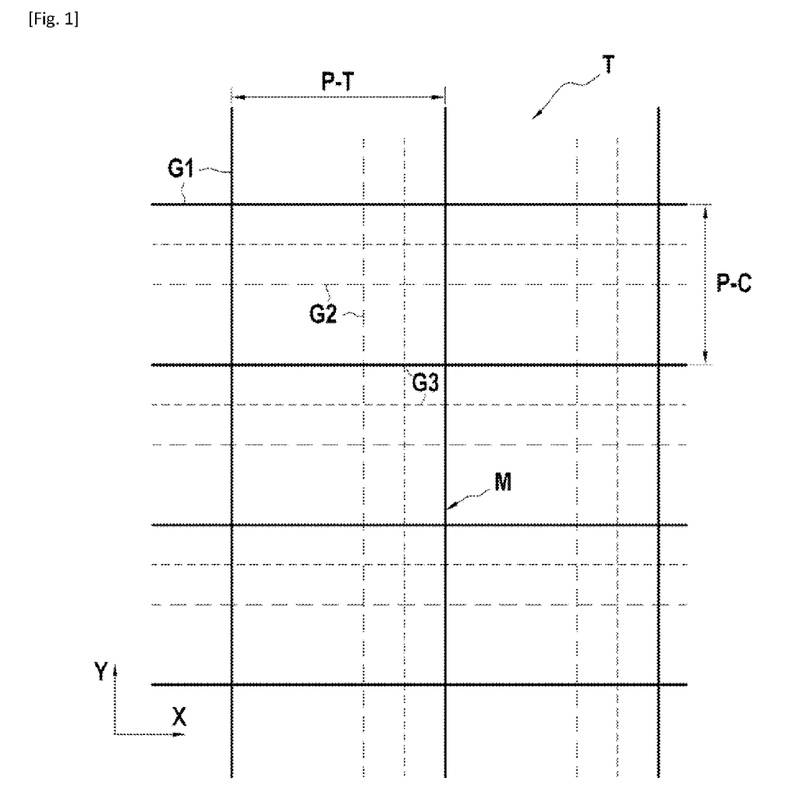
FIG. 1 is a schematic view of an example of a repeating pattern fabric to which the invention applies.

An example of a repeating pattern fabric to which the invention applies is represented in FIG. 1.

This FIG. 1 represents a fabric T with repeating patterns M having a main grid G1 and two secondary grids G2, G3, these grids G1 to G3 having offsets in the weft direction and in the warp direction relative to each other (the warp direction being schematized by the X-axis and the weft direction by the Y-axis). The patterns M are characterized in particular by their warp pitch P-C and their weft pitch P-T.

The information extracted from the characterization of the fabric T is then used to create the theoretical placement of the pieces.

The theoretical placement operation consists in determining the locations of the pieces to be cut. The placement is made in such a way as to minimize the losses of material, while complying with some constraints (respect of the straight grain, minimum spacing between the pieces to be cut, etc.).

In the case of a fabric with repeating patterns, aesthetic imperatives may impose on the one hand, for some pieces, the presence of a complete pattern at a particular location in the piece and on the other hand, for two pieces intended to be assembled, a cutting of these pieces ensuring for example the continuity of the pattern after assembly.

To this end, the next step in the placement method consists in characterizing each piece of the placement by assigning it an initial contour, a reference point and at least one placement constraint.

Figure 2:
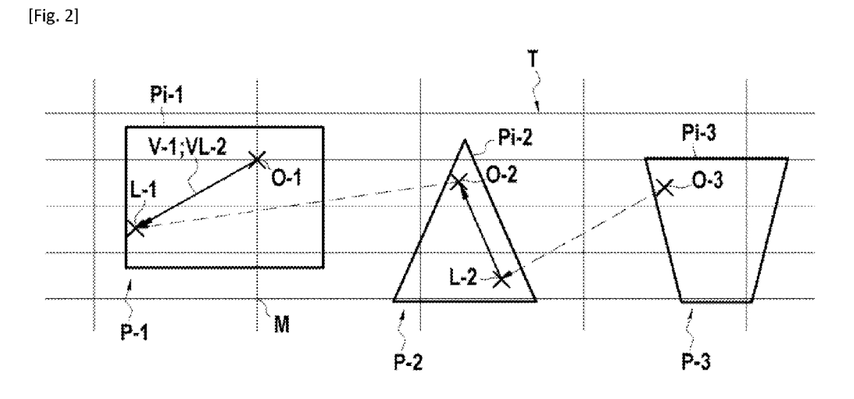
FIG. 2 is a view schematically illustrating different types of pieces to be placed on the fabric of FIG. 1.

FIG. 2 represents an example of three pieces to be placed P-1 to P-3 on the fabric T with patterns M. Each of these pieces is assigned an initial contour, respectively Ci-1, Ci-2 and Ci-3.

These initial contours are typically defined by computer aided design (CAD) software without any margins. They are represented by a polygon; namely a rectangle for the piece P-1, a triangle for the piece P-2 and a trapezoid for the piece P-3.

Each piece of the placement P-1 to P-2 is associated with a reference point, respectively O-1, O-2 and O-3, and at least one constraint for placing the piece on the fabric.

The reference point of each piece is defined by the operator regardless of the placement constraint used. It is a point on the piece that is important to position.

The placement constraint is chosen by the operator among one of the following placement constraints:

1/Absolute Constraint:

This constraint is associated with a piece that must be positioned on the fabric at a specific location for a pattern of the fabric to appear at a desired location of the piece. For this constraint, the position of the reference point of the piece relative to the fabric pattern is predetermined.

In the example of FIG. 2, only the piece P-2 is associated with an absolute placement constraint.

2/Relative Constraint:

This constraint is associated with a first piece, called "child piece", whose position on the fabric is determined according to the position of a second piece, called "parent piece". For this constraint, the position of the reference point of the child piece is determined relative to a link point L of the parent piece such that the position of the reference point of the child piece relative to the fabric pattern is the same as the position of the link point of the parent piece.

In the example of FIG. 2, the piece P-1 is the parent piece of the piece P-2 (child piece) so that the piece P-1 has a link point L-1 which allows positioning the reference point O-2 of the piece P-2. Likewise, the piece P-2 is the parent piece of the piece P-3 (child piece) so that the piece P-2 has a link point L-2 which allows positioning the reference point O-3 of the piece P-3. In contrast, the piece P-1 is a piece without parent and the piece P-3 is a piece without child.

Each parent piece is assigned at least one piece vector which is defined between its reference point and its link point (see in FIG. 2 the piece vector V-1 of the piece P-1 defined between the points O-1 and L-1, and the piece vector V-2 of the piece P-2 defined between the points O-2 and L-2).

It should be noted that the same piece can contain several piece vectors because it can be the parent of several child pieces.

At each child piece, a link vector is defined which is the sum of the piece vectors of all the parent pieces in the link warp associated with the child piece. In the example of FIG. 2, the link vector VL-2 of the child piece P-2 is equal to the piece vector V-1 of the piece P-1 (the piece P-1 is a parent piece for the piece P-2). Likewise, the link vector VL-3 of the piece P-3 (not represented) is equal to the sum of the piece vector V-2 of the piece P-2 (P-2, parent of P-3) and of the piece vector V-1 of the piece P-1 (P-1, parent of P-2).

It should be noted that a piece without parent has a zero link vector.

3/Free Constraint:

This constraint is associated with a piece whose position relative to the fabric pattern is free (i.e. absence of relative or absolute constraint). For this constraint, the position of the reference point of the piece relative to the fabric pattern is free.

Once the information relating to the characteristics of the fabric and to the different pieces of the placement has been determined and recorded, the placement of the pieces is calculated.

Figure 3:
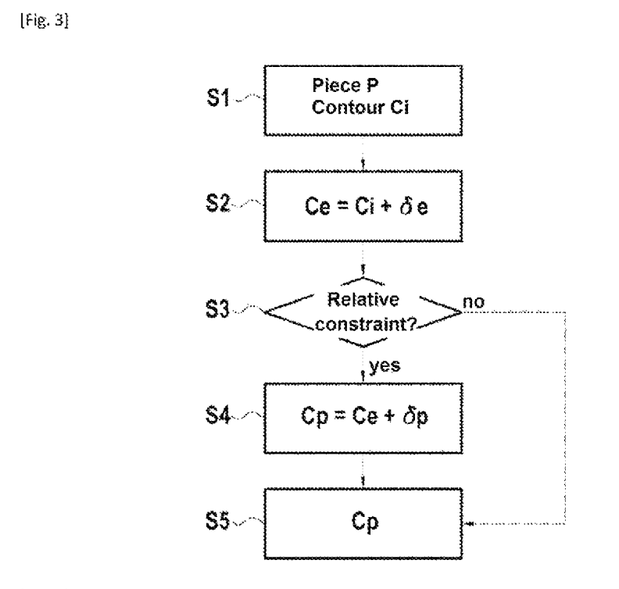
FIG. 3 is a flowchart schematizing the different steps of the placement method according to one embodiment of the invention.

FIG. 3 represents a flowchart of the steps of the placement method according to one embodiment of the invention.

Each piece P of the placement is treated individually. From the initial contour Ci associated with the piece (step S1), a spacing margin δe to be applied to the initial contour of the piece is calculated first in order to obtain a spacing contour Ce of the piece (step S2). This spacing margin calculation is independent of the placement constraint associated with the piece.

Then, if the placement constraint associated with the piece P is a relative constraint (step S3), a positioning margin δp to be applied to the spacing contour Ce of the previously calculated piece (step S4) is calculated in order to obtain the contour to be placed Cp of the piece (step S5).

If no relative constraint is associated with the piece, the contour to be placed Cp of the piece is the spacing contour Ce calculated in step S2.

Once the spacing contour has been obtained for the piece, one moves on to the next piece of the placement until calculating the contour to be placed of all the pieces of the placement.

The next step of the method (not represented in FIG. 3) then consists in developing a theoretical placement of the pieces on the fabric which takes into account the contour to be placed C'p of each piece. In a manner known per se, the theoretical placement is carried out so as to minimize the losses of material, while complying with some constraints (respect of the straight grain, minimum spacing between the pieces to be cut, etc.).

Figure 4:
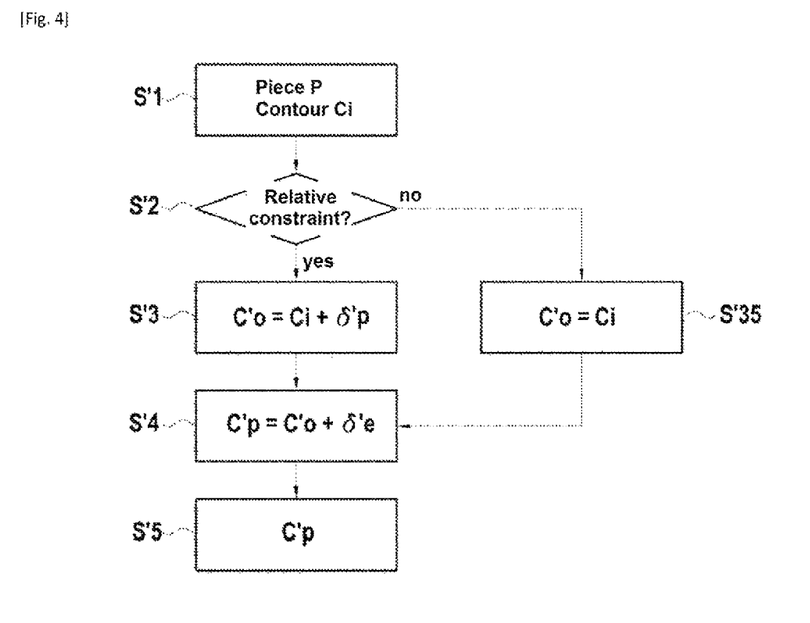
FIG. 4 is a flowchart schematizing the different steps of the placement method according to another embodiment of the invention.

FIG. 4 represents a flowchart of the steps of the placement method according to another embodiment of the invention.

Each piece P of the placement is also treated individually. From the initial contour Ci associated with the piece (step S'1), it is first determined whether a relative constraint is associated with the piece (step S'2). If this is the case, a positioning margin δ'p to be applied to the initial contour Ci of the piece is calculated first in order to obtain a positioning contour C'o of the piece (step S'3).

If no relative constraint is associated with the piece, the positioning contour C'o is equal to the initial contour Ci (step S'35).

Then, a spacing margin δ'e to be applied to the previously calculated (step S'4) positioning contour C'o of the piece is calculated in order to obtain the contour to be placed C'p of the piece (step S'5). This spacing margin calculation is independent of the placement constraint associated with the piece.

The next step of the method (not represented in FIG. 4) then consists of developing a theoretical placement of the pieces on the fabric which takes into account the contour to be placed C'p of each piece.

Figure 5:
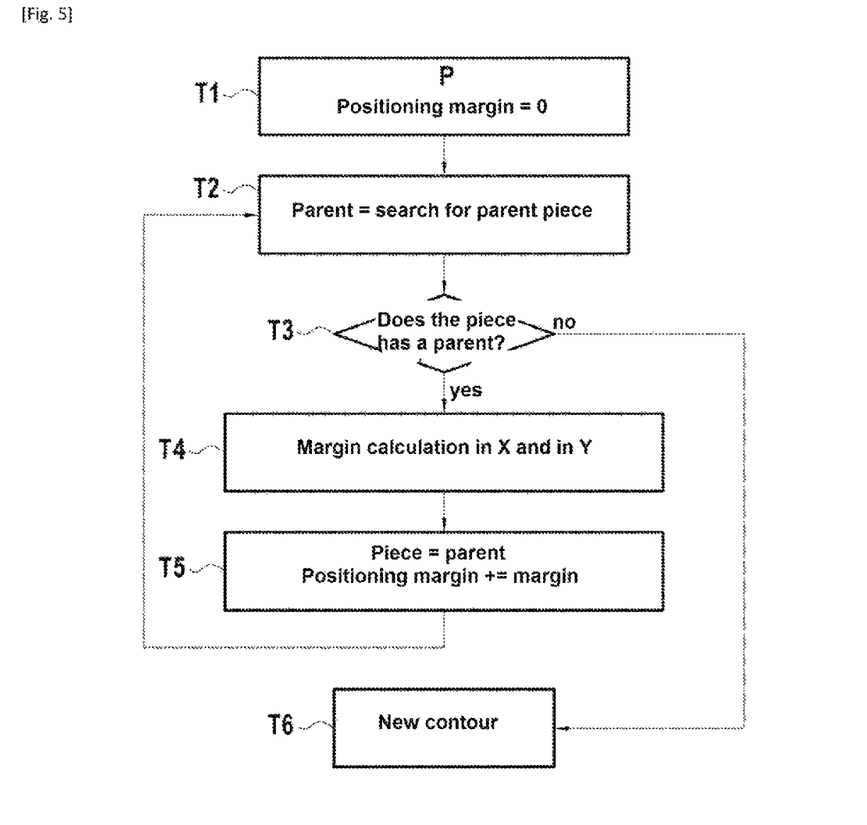
FIG. 5 is a flowchart schematizing the different steps of an example of calculation of the positioning margin of the placement method according to the invention.

In connection with FIG. 5, an example of calculation of a positioning margin as described in the methods of FIGS. 3 and 4 will now be described.

As a preamble, it will be recalled that the step of calculating a positioning margin as described in the methods of FIGS. 3 and 4 applies only to the pieces to which a relative constraint is associated (the positioning margin of a piece to which an absolute constraint or a free constraint is associated is zero).

As a preamble, the calculation of the positioning margin applies to a piece P having a primary contour (step T1), this primary contour possibly being the spacing contour Ce of the piece calculated in step S2 in the case of the method illustrated in FIG. 3, or the initial contour Ci of the piece in step S1' in the case of the method illustrated in FIG. 4.

The first step consists in finding the parent piece of the piece P in question among all the pieces of the placement (step T2).

If the piece in question is a child piece related to a parent piece (step T3), the positioning margin of the piece is then calculated (step T4) according to the calculation detailed below.

For each direction of the fabric (warp direction X and weft direction Y), the positioning margin is given by the product between the rate of variation of the fabric and the piece vector of the parent piece, which gives:

Positioning margin $X$=[Fabric variation rate in $X$]*[Piece vector in $X$]

Positioning margin $Y$=[Fabric variation rate in $Y$]*[Piece vector in $Y$]

The piece in question then becomes its parent (step T5) so that steps T2 to T4 are repeated for the "parent of the parent".

This recursive function is thus similar to calculating the positioning margin as being the product between the fabric variation rate and the piece link vector (the link vector being, as indicated previously, the sum of the piece vectors of all the pieces parent of the link warp associated with the piece in question).

At the end of the final step (step T6), the new contour of the piece is then determined by applying the positioning margins (in absolute value) according to the X, Y directions to the primary contour of the piece.

In connection with FIG. 6, an example of calculation of a spacing margin as described in the methods of FIGS. 3 and 4 will now be described.

As a preamble, the calculation of the spacing margin applies to a piece P having a primary contour (step U1), this primary contour possibly being the initial contour Ci of the piece in step S1 in the case of the method illustrated in FIG. 3, or the positioning contour C'o of the piece calculated in step S'3 in the case of the method illustrated in FIG. 4.

The next step consists in dividing the primary contour of the piece into a plurality of edges (or segments) of the polygon corresponding to the contour (step U2), each edge of the polygon being treated.

If there is such an edge (step U3), it is discretized to obtain a plurality of sub-edges (step U4).

Also, the next step U5, U6 consists in checking whether for a given edge, there is a sub-edge. If so, the calculation of the spacing margin for that sub-edge is performed in step U7 and is equal, for each direction of the fabric and for each end point of the sub-edge, to the product between the rate of variation of the fabric and the vector between the corresponding end point of the sub-edge and the reference point of the piece, which gives:

Spacing margin $X$=[Fabric variation rate in $X$]*[Sub-edge end point vector in $X$]

Spacing margin $Y$=[Fabric variation rate in $Y$]*[Sub-edge end point vector in $Y$]

Rectangles centered on these points whose dimensions in X and in Y are respectively the spacing margin X and the spacing margin Y calculated for each of these end points are then obtained for the end points of the sub-edge. The spacing contour of the sub-edge is obtained by calculating the convex envelope of the points of these two rectangles (step U8). This calculation can for example be performed using Andrew's algorithm well known per se.

Then, a reiteration of step U7 for the next sub-edge is provided. If there are no more sub-edges (that is to say all the sub-edges of the edge have been treated), the next step consists in calculating the edge spacing contour resulting from the union of all the sub-edge spacing contours.

Steps U2 to U8 are then reiterated for all the edges of the primary contour of the piece.

At the end of the calculation of the spacing contour of each edge of the primary contour of the piece, the spacing contour of the piece is calculated (step U9) resulting from the union of all the spacing contours calculated for all the edges of the piece.

It will be noted that in the calculations of the spacing and positioning margins detailed in connection with FIGS. 5 and 6, the rate of variation of the fabric is equal, for each direction of the fabric, to a percentage of elongation of the fabric pattern in said direction.

In connection with FIGS. 7 to 13, an example of application of the placement method as described in the flowchart of FIG. 3 will now be described.

In this example, the placement piece group comprises four pieces P-1 to P-4 assembled together to form a rectangle (see FIG. 7), including:
 a piece P-1 having an absolute placement constraint,
 two pieces P-2 and P-3 having relative placement constraints which form a link warp, namely: the piece P-1 is the parent piece of the child piece P-2, and the piece P-2 is the parent piece of the child piece P-3, a piece P-4 having a free placement constraint.

Figure 7:
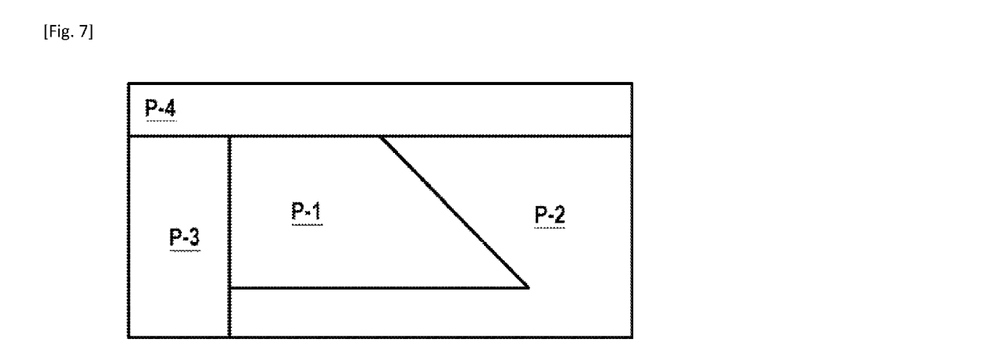
FIGS. 7 to 13 illustrate different steps of an exemplary implementation of the method for placing according to the invention a group of pieces to be placed.

Also in this example, the fabric in which the placement is calculated has a rate of variation of 2% on the X axis (warp direction, noted Wx) and 1% on the Y axis (weft direction, noted Wy).

Figure 8:
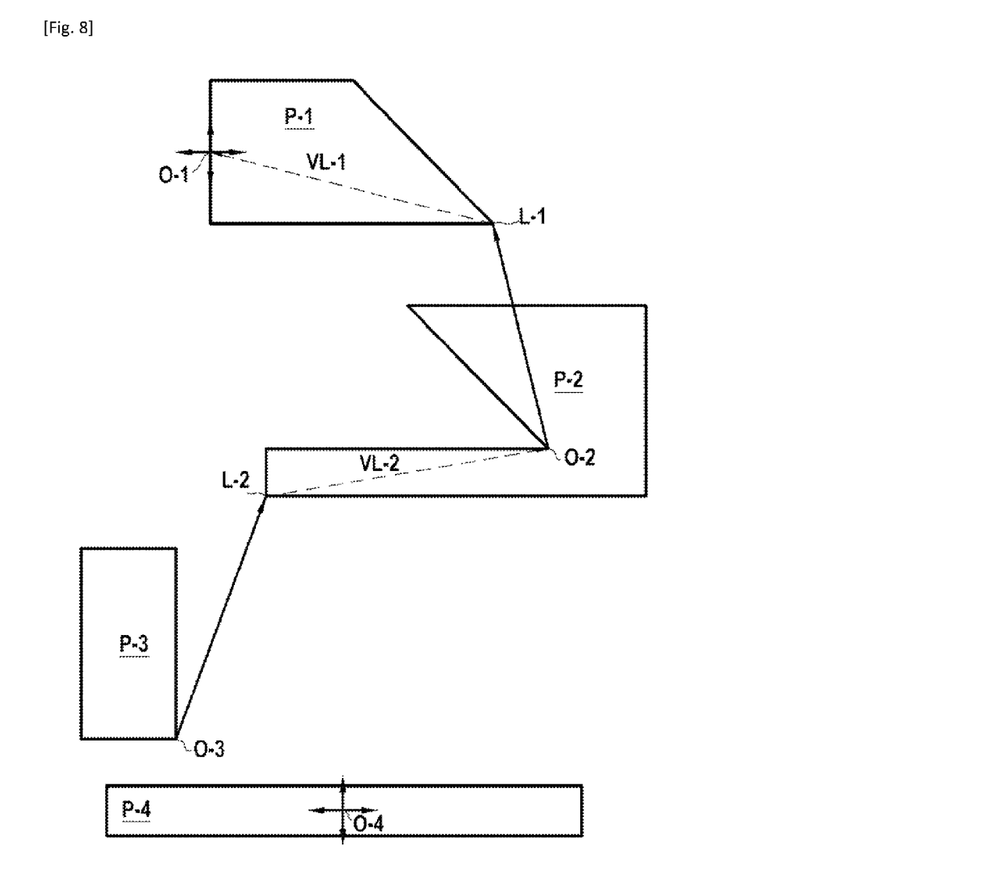

FIG. 8 represents the different data relating to the pieces P-1 to P-4 in the coordinate system (0, X, Y), the point 0 being for example defined as being located in a corner of a rectangle enclosing each piece.

For the piece P-1 (parent piece of P-2), it has:
a reference point O-1 whose coordinates are: (0, 75)
a link point L-1 whose coordinates are: (300, 0)
a link vector VL-1 whose coordinates are: (−300, 75)

For the piece P-2 (child piece of P-1 and parent piece of P-3), it has:
a reference point O-2 whose coordinates are: (300, 50)
a link point L-2 whose coordinates are: (0, 0)
a link vector VL-2 whose coordinates are: (300, 50)

For the piece P-3 (child piece of P-2), it has:
a reference point O-3 whose coordinates are: (100, 0)

For the piece P-4, it has:
a reference point O-4 whose coordinates are: (250, 25)

In the method described in connection with the flowchart of FIG. 3, the calculation of the spacing margin of the initial contour of each piece of the placement is first performed.

Figure 9:
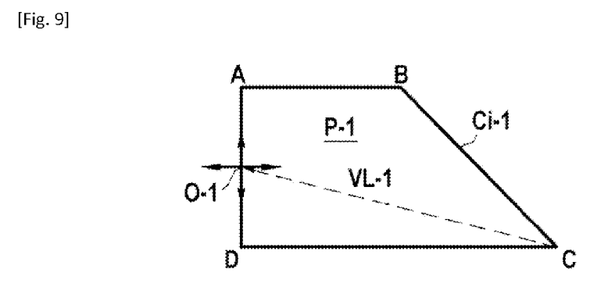

FIG. 9 illustrates how such a calculation is made for the piece P-1.

Figure 6:
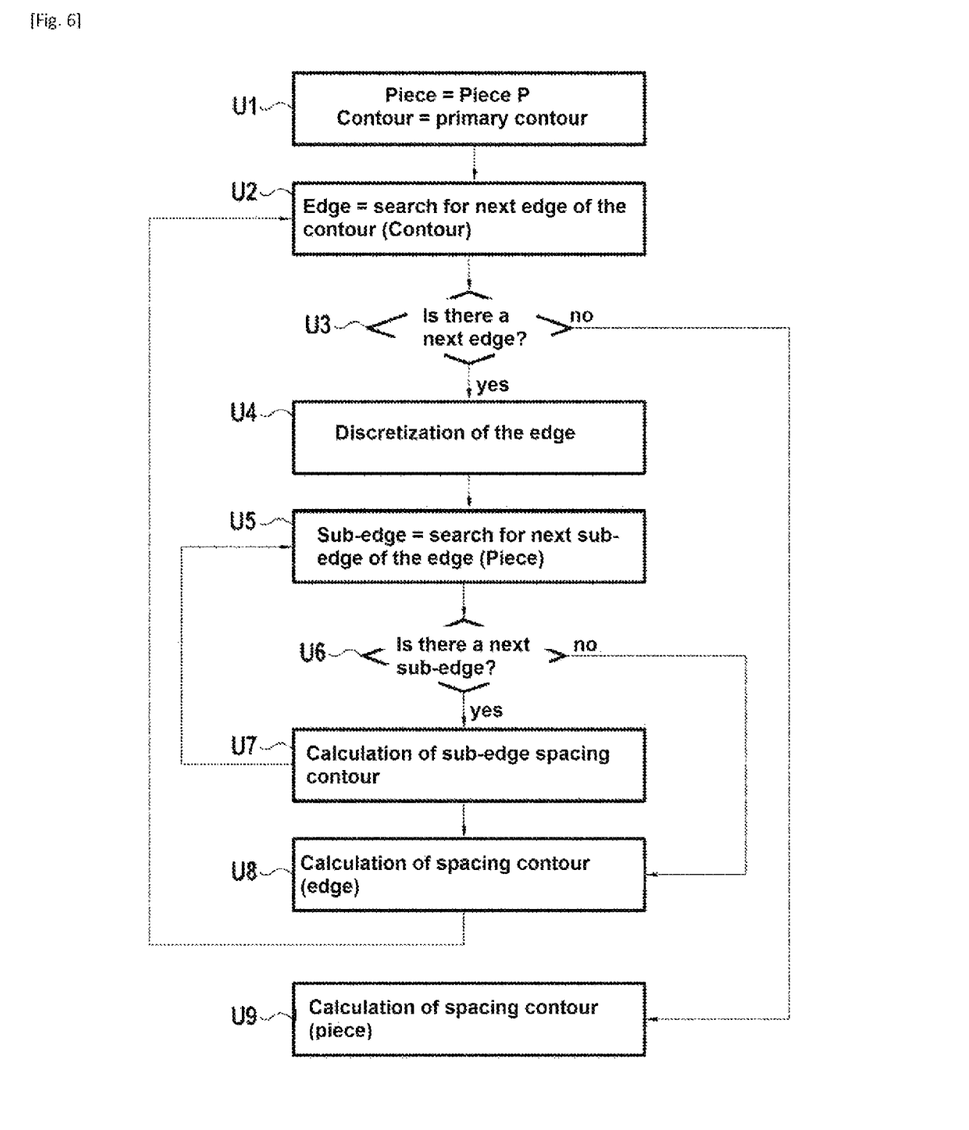
FIG. 6 is a flowchart schematizing the different steps of an example of calculation of the spacing margin of the placement method according to the invention.

Particularly, as detailed previously in connection with FIG. 6, the calculation of the spacing margin of the polygon (ABCD) corresponding to the initial contour Ci-1 of the piece P-1 is performed by the union of all the convex envelopes calculated for all the edges of the polygon of the piece, namely the edges: (A, B), (B, C), (C, D), and (D, A).

If the example of the edge (B, C) is considered, a discretization of this edge into sub-edges each having for example a length of 5 mm is first carried out, which gives 212 mm/5 mm=43 sub-edges noted ssi (ss1, ss2, ss3, . . . , ss43). Each sub-edge ssi has two ends noted pt1 and pt2.

For each sub-edge ssi, the spacing margin is then given by the following calculation (at point pt1):

$$\text{Spacing margin } X = [(ssi \text{ in } X) * (pt1 \text{ in } X) - (O{-}1 \text{ in } X)] * (Wx) * 2$$

$$\text{Spacing margin } Y = [(ssi \text{ in } Y) * (pt1 \text{ in } Y) - (O{-}1 \text{ in } Y)] * (Wy) * 2$$

If (150, 150) are taken as coordinates for pt1, the calculation of the spacing margin gives for this point:

$$\text{Spacing margin } X = [150 - 0] * 0.02 * 2 = 6 \text{ mm}$$

$$\text{Spacing margin } Y = [150 - 75] * 0.01 * 2 = 1.50 \text{ mm}$$

If (153.50, 146.50) are taken as coordinates for pt2, the calculation of the spacing margin gives for this point:

$$\text{Spacing margin } X = [153.50 - 0] * 0.02 * 2 = 6.14 \text{ mm}$$

$$\text{Spacing margin } Y = [146.50 - 75] * 0.01 * 2 = 1.43 \text{ mm}$$

Rectangles centered on these points whose dimensions in X and in Y are respectively the spacing margin X and the spacing margin Y calculated for each of these points are then obtained for the points pt1 and pt2 of the sub-edge ssi. The spacing contour of the sub-edge is obtained by calculating the convex envelope of the points of these two rectangles. This calculation is repeated for each sub-edge ssi of the edge (B, C) of the polygon of the piece P-1. The spacing contour of the edge (B, C) is obtained by calculating the enclosing contour of the union of all the spacing contours of the sub-edges ssi.

Figure 10:
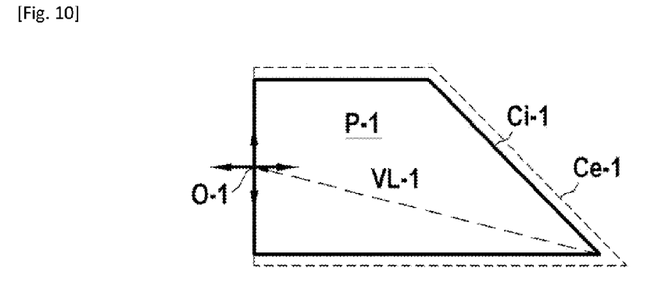

After having calculated the spacing contour for each edge of the polygon, the spacing contour Ce-1 represented in FIG. 10 by calculating the contour resulting from the union of the spacing contours of each edge is then obtained.

It will be noted here that in the wrap direction (X direction), there is no spacing margin at the reference point O-1 and that the further away from this reference point, the greater the greater the spacing margin. Likewise, in the weft direction (Y direction), the spacing margin is the same at the top and at the bottom (which is consistent with the fact that the reference point O-1 is located equidistant from the top and from the bottom of the piece).

The next step of the placement method as described in the flowchart of FIG. 3 consists in calculating the positioning margin applied to each piece P-1 to P-4 from the previously calculated spacing contour.

As indicated previously, the positioning margin is zero for the pieces with an absolute placement constraint and for the pieces with a free placement constraint, namely here the pieces P-1 and P-4.

Figure 11:
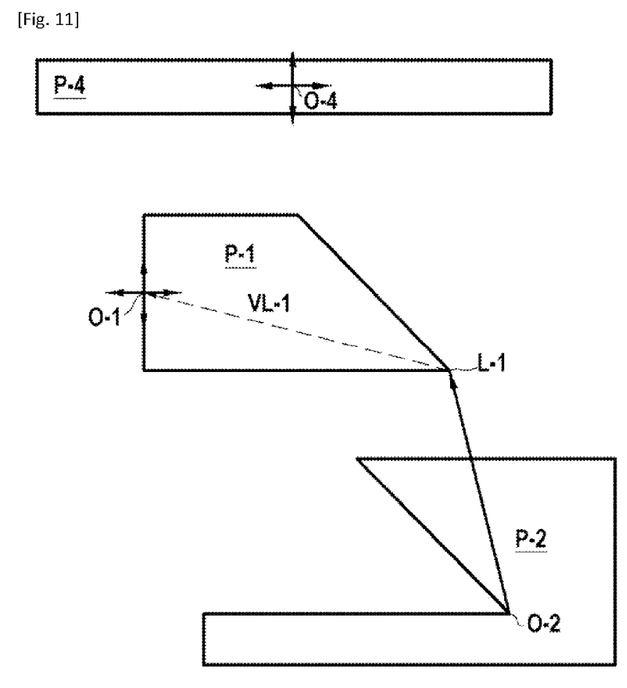

In the example illustrated in FIG. 11, there will be first interest on the calculation of the positioning margin for the piece P-2.

This positioning margin is calculated by summing the link vectors of the parent pieces. In this case, the parent of the child piece P-2 is the piece P-1 and the latter has no parent.

Thus, the calculation of the positioning margin for the piece P-2 is as follows:

$$\text{Positioning margin } X = (VL{-}1 \text{ in } X) * Wx = (-300) * 0.02 = -6 \text{ mm}$$

$$\text{Positioning margin } Y = (VL{-}1 \text{ in } Y) * Wy = 75 * 0.01 = 0.75 \text{ mm}$$

The contour of the piece P-2 is then set to a margin of 6 mm in the warp direction (X direction) and of 0.75 mm in the weft direction (Y direction). It will be noted that the margins in absolute value will be taken.

Figure 12:
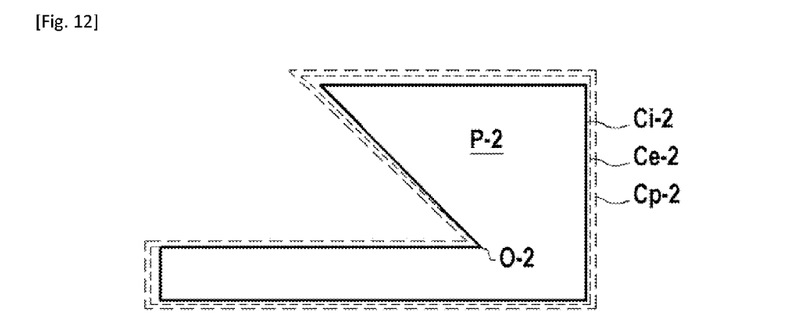

FIG. 12 represents the application of the spacing and positioning margins thus calculated to the piece P-2 with its initial contour Ci-2, its spacing contour Ce-2, and its contour to be placed Cp-2.

Figure 13:
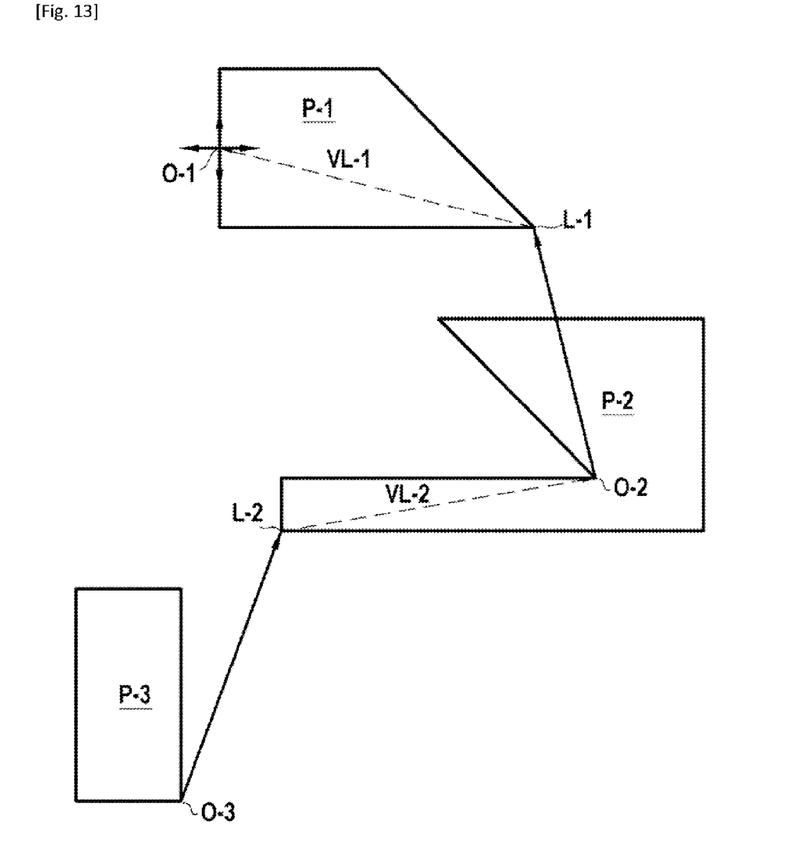

In the example illustrated in FIG. 13, there will be interest on the calculation of the positioning margin of the piece P-3.

This positioning margin is calculated by summing the link vectors of the parent pieces. In this case, the parent of the child piece P-3 is the piece P-2 and the parent of the piece P-2 is the piece P-1, the latter has no parent.

Thus, the calculation of the positioning margin for the piece P-3 is as follows:

$$\text{Positioning margin } X = (VL-2 \text{ in } X + VL-1 \text{ in } X) * Wx$$

$$\text{Positioning margin } X = (300 - 300) * 0.02 = 0 \text{ mm}$$

$$\text{Positioning margin } Y = (VL-2 \text{ in } Y + VL-1 \text{ in } Y) * Wy$$

$$\text{Positioning margin } Y = (75 + 50) * 0.01 = 1.25 \text{ mm}$$

In this example, there is a positioning margin which is zero in the X direction.

The invention claimed is:

1. A method for placing pieces intended to be cut automatically from a fabric having a pattern that repeats at a predetermined pitch, called pattern pitch, the method comprising the steps of:
    (a) determining a list of pieces to be placed on the fabric;
    (b) for at least one piece of the placement, calculating a contour to be placed around the piece, the contour comprising a variable margin in order to avoid an overlap between adjacent pieces, the margin being a function of a predefined rate of variation of the fabric and of at least one predetermined constraint of placement of the piece on the fabric; and
    (c) developing a theoretical placement of the pieces on the fabric taking into account the contour to be placed for the at least one piece;
    wherein the rate of variation of the fabric corresponds to a percentage of elongation of the pattern fabric.

2. The method according to claim 1, wherein each piece is associated with an initial contour represented by a polygon, a reference point, and the at least one predetermined constraint of placement of the piece on the fabric chosen among:
    absolute constraint for which the position of the reference point of the piece relative to the fabric pattern is determined so that a fabric pattern appears at a desired location in the piece;
    relative constraint for which the position of the reference point of the piece, called child piece, is determined relative to a link point of another piece, called parent piece, so that the position of the reference point of the child piece relative to the fabric pattern is the same as the position of the link point of the parent piece; and
    free constraint for which the position of the reference point of the piece relative to the fabric pattern is free.

3. The method according to claim 2, wherein the calculation of the contour to be placed comprises, for each piece, a step of calculating a spacing margin to be applied to the initial contour of the piece in order to obtain a spacing contour of the piece, followed by a step of calculating a positioning margin to be applied to the spacing contour of the piece in order to obtain the contour to be placed of the piece.

4. The method according to claim 3, wherein the spacing margin of a piece is calculated according to a weft direction and a warp direction of the fabric and for each edge of the polygon representing the initial contour of the piece, the spacing margin of an edge being equal, for each direction of the fabric, to the product between the rate of variation of the fabric and a vector between points of the edge and the reference point of the piece.

5. The method according to claim 4, wherein the rate of variation of the fabric is equal, for each direction of the fabric, to a percentage of elongation of the fabric pattern in said direction.

6. The method according to claim 3, wherein the positioning margin of a piece with which an absolute constraint or a free constraint is associated is zero.

7. The method according to claim 3, wherein the positioning margin of a child piece with which a relative constraint is associated is calculated according to a weft direction and a warp direction of the fabric and is equal, for each direction of the fabric, to the product between the rate of variation of the fabric and a link vector of the piece, the link vector being the sum of the piece vectors of all the parent pieces of a link warp associated with the child piece, the piece vector of a parent piece being defined between its reference point and its link point.

8. The method according to claim 2, wherein the calculation of the contour to be placed comprises, for each piece, a step of calculating a positioning margin to be applied to the initial contour of the piece in order to obtain a positioning contour of the piece, followed by a step of calculating a spacing margin to be applied to the positioning contour of the piece in order to obtain the contour to be placed of the piece.

9. The method according to claim 8, wherein the positioning margin of a piece with which an absolute constraint or a free constraint is associated is zero.

10. The method according claim 8, wherein the positioning margin of a child piece with which a relative constraint is associated is calculated according to a weft direction and a warp direction of the fabric and is equal, for each direction of the fabric, to the product between the rate of variation of the fabric and a link vector of the piece, the link vector being the sum of the piece vectors of all the parent pieces of a link warp associated with the child piece, the piece vector of a parent piece being defined between its reference point and its link point.

11. The method according to claim 8, wherein the spacing margin of a piece is calculated according to a weft direction and a warp direction of the fabric and for each edge of the polygon representing the initial contour of the piece, the spacing margin of an edge being equal, for each direction of the fabric, to the product between the rate of variation of the fabric and a vector between points of the edge and the reference point of the piece.

* * * * *